United States Patent
Ramacher et al.

(10) Patent No.: US 7,526,409 B2
(45) Date of Patent: Apr. 28, 2009

(54) AUTOMATIC PERFORMANCE STATISTICAL COMPARISON BETWEEN TWO PERIODS

(75) Inventors: Mark C. Ramacher, San Carlos, CA (US); Cecilia Gervasio Grant, Belmont, CA (US); Graham Stephen Wood, El Granada, CA (US); Konstantina Dialeris Green, San Carlos, CA (US); Russell John Green, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 336 days.

(21) Appl. No.: 11/245,905

(22) Filed: Oct. 7, 2005

(65) Prior Publication Data

US 2007/0083564 A1 Apr. 12, 2007

(51) Int. Cl.
*G06F 19/00* (2006.01)
*G06F 17/40* (2006.01)
*G06F 11/30* (2006.01)

(52) U.S. Cl. .................. 702/182; 340/500; 340/540; 340/679; 702/33; 702/34; 702/179; 702/187; 702/189; 705/7; 705/11

(58) Field of Classification Search .............. 340/500, 340/540, 635, 679; 702/1, 33, 34, 127, 179, 702/182, 183, 187, 189; 705/1, 7, 11
See application file for complete search history.

(56) References Cited

U.S. PATENT DOCUMENTS 2,883,255 A * 4/1959 Anderson ............... 346/34
3,588,837 A * 6/1971 Rash et al. ............. 702/182
5,548,539 A * 8/1996 Vlach et al. ............... 703/6

(Continued)

FOREIGN PATENT DOCUMENTS

EP 0 750 256 A2 6/1996

(Continued)

OTHER PUBLICATIONS

Chase, Jeffrey S. et al., "Dynamic Virtual Clusters in a Grid Site Manager," Proceedings of the 12th IEEE International Symposium on High Performance Distributed Computing (HPDC'03), 2003, IEEE, pp. 90-100.

(Continued)

*Primary Examiner*—Edward R Cosimano
(74) *Attorney, Agent, or Firm*—Hickman Palermo Truong & Becker LLP

(57) ABSTRACT

A technique for automatically generating a report comprising normalized differences in performance statistics between two separate periods. In one embodiment of the invention, database performance statistics are collected on a periodic basis over various time periods. In order to accurately compare database system performance between two discrete periods of time, the difference in the performance statistics of each period are normalized prior to comparing the two periods with each other. By normalizing the statistical differences in each period prior to comparing the differences, periods of different lengths of time as well as different levels of database system load may be compared. In one embodiment, a report is automatically generated which lists the performance statistics being evaluated, the difference in the statistic between each period, the value of each statistical difference as normalized by database time, and the difference between the normalized values.

20 Claims, 3 Drawing Sheets

U.S. PATENT DOCUMENTS

| | | | |
|---|---|---|---|
| 5,721,825 A | 2/1998 | Lawson et al. | |
| 5,890,167 A | 3/1999 | Bridge, Jr. et al. | |
| 5,933,604 A | 8/1999 | Inakoshi | |
| 5,951,694 A | 9/1999 | Choquier et al. | |
| 6,041,357 A | 3/2000 | Kunzelman et al. | |
| 6,088,728 A | 7/2000 | Bellemore et al. | |
| 6,243,751 B1 | 6/2001 | Chatterjee et al. | |
| 6,732,063 B2* | 5/2004 | Famili et al. | 702/188 |
| 6,738,933 B2* | 5/2004 | Fraenkel et al. | 714/47 |
| 7,292,961 B2* | 11/2007 | Dias et al. | 702/186 |
| 7,395,187 B2* | 7/2008 | Duyanovich et al. | 702/183 |
| 7,401,143 B2* | 7/2008 | Oulu et al. | 709/224 |
| 7,406,631 B2* | 7/2008 | Moore | 714/47 |
| 7,437,446 B2* | 10/2008 | Bailey et al. | 709/223 |
| 2001/0056493 A1 | 12/2001 | Mineo | |
| 2002/0073139 A1 | 6/2002 | Hawkins et al. | |
| 2002/0161896 A1 | 10/2002 | Wen et al. | |
| 2002/0198984 A1* | 12/2002 | Goldstein et al. | 709/224 |
| 2002/0198985 A1* | 12/2002 | Fraenkel et al. | 709/224 |
| 2003/0005028 A1 | 1/2003 | Dritschler et al. | |
| 2003/0037146 A1 | 2/2003 | O'Neill | |
| 2003/0039212 A1 | 2/2003 | Lloyd et al. | |
| 2003/0065986 A1* | 4/2003 | Fraenkel et al. | 714/47 |
| 2003/0135609 A1 | 7/2003 | Carlson et al. | |
| 2003/0149550 A1* | 8/2003 | Famili et al. | 702/188 |
| 2004/0064548 A1 | 4/2004 | Adams et al. | |
| 2004/0103195 A1 | 5/2004 | Chalasani et al. | |
| 2005/0027858 A1* | 2/2005 | Sloth et al. | 709/224 |
| 2005/0038800 A1* | 2/2005 | Chidambaran et al. | 707/100 |
| 2005/0038833 A1* | 2/2005 | Colrain et al. | 707/203 |
| 2005/0055383 A1* | 3/2005 | Dias et al. | 707/202 |
| 2005/0086242 A1* | 4/2005 | Ngai et al. | 707/100 |
| 2005/0086263 A1* | 4/2005 | Ngai et al. | 707/104.1 |
| 2005/0120111 A1* | 6/2005 | Bailey et al. | 709/224 |
| 2005/0251792 A1* | 11/2005 | Smith | 717/131 |
| 2006/0161816 A1* | 7/2006 | Gula et al. | 714/39 |
| 2008/0209027 A1* | 8/2008 | Duyanovich et al. | 709/223 |

FOREIGN PATENT DOCUMENTS

| | | |
|---|---|---|
| EP | 0 942 363 A2 | 9/1999 |
| EP | 0 992 909 A2 | 4/2000 |
| EP | 1 170 662 A2 | 1/2002 |
| EP | 1 260 902 A2 | 5/2002 |
| WO | WO 00/10084 A | 2/2000 |
| WO | WO 02/05116 A2 | 1/2002 |
| WO | WO 02/07037 A | 1/2002 |
| WO | WO 02/097676 A2 | 12/2002 |
| WO | WO 03/014928 A2 | 2/2003 |
| WO | WO 03/014929 A | 2/2003 |
| WO | WO 03/062983 A2 | 7/2003 |

OTHER PUBLICATIONS

Kokku, Ravi et al., "Half-pipe Anchoring: An Efficient Technique for Multiple Connection Handoff," Proceedings 10th International Conference on Network Protocols, Nov. 12, 2002, XP010632563, 10 pages.

Lin, Ying-Dar et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

International Searching Authority, "Notification of Transmittal of the International Search Report and the Written Opinion of the International Searching Authority, or the Declaration," PCT/US2004/026506, Sep. 8, 2005, 12 pages.

Current Claims of International Application No. PCT/US2004/026506, 9 pages.

International Searching Authority, "Notification of Transmittal of the International Search Report and the Written Opinion of the International Searching Authority, or the Declaration," PCT/US2004/025805, dated Dec. 3, 2004, 12 pages.

Current Claims of International Application No. PCT/US2004/025805, 8 pages.

International Searching Authority, "Notification of Transmittal of the International Search Report and the Written Opinion of the International Searching Authority, or the Declaration," PCT/US2004/026389, Aug. 4, 2005, 13 pages.

Current Claims for International Application No. PCT/US2004/026389, pp. 1-7.

International Searching Authority, "Notification of Transmittal of the International Search Report and the Written Opinion of the International Searching Authority, or the Declaration," PCT/US2004/026445, Aug. 25, 2005, 12 pages.

Current Claims for International Application No. PCT/US2004/026445, pp. 1-5.

International Preliminary Examining Authority, "Written Opinion of the International Preliminary Examining Authority," PCT/US2004/026570, Jun. 7, 2005, 4 pages.

Current Claims of International Application No. PCT/US2004/026570, 4 pages.

International Searching Authority, "Notification of Transmittal of the International Search Report and the Written Opinion of the International Searching Authority, or the Declaration," PCT/US2004/026405, dated Jan. 6, 2006, 13 pages.

Current Claims, PCT/US2004/026405, 7 pages.

International Searching Authority, "Notification of Transmittal of the International Search Report and the Written Opinion of the International Searching Authority, or the Declaration," PCT/US2005/025887, Feb. 2, 2006, 12 pages.

Current Claims for International Application No. PCT/US2005/025887, 3 pages.

International Searching Authority, "Notification of Transmittal of the International Search Report and the Written Opinion of the International Searching Authority, or the Declaration," PCT/US2004/026570, dated Nov. 25, 2004, 13 pages.

International Searching Authority, "Notification of Transmittal of the International Search Report and the Written Opinion of the International Searching Authority, or the Declaration," PCT/US2004/026389, Dated Feb. 2, 2006, 16 pages.

Current Claims for International Application No. PCT/US2004/026389, pp. 1-9.

"Office Action" received in related case U.S. Appl. No. 10/917,661, filed Aug. 12, 2004, 9 pages.

* cited by examiner

FIG. 2

AUTOMATIC PERFORMANCE STATISTICAL COMPARISON BETWEEN TWO PERIODS

CROSS-REFERENCES TO RELATED APPLICATIONS

The present application is related to U.S. patent application Ser. No. 10/775,733, U.S. Pat. No. 7,125,136, entitled "Capturing Session Activity As In-Memory Snapshots Using A Time-Based Sampling Technique Within A Database For Performance Tuning And Problem Diagnosis", filed on Feb. 09, 2004, which is hereby incorporated herein by reference and referred to herein as the Capturing Session Activity Application.

This application hereby incorporates by reference as if fully set forth herein the following U.S. patent applications: application Ser. No. 10/917,715 U.S. Published Patent Application 2005-0038833 A1, filed Aug. 12, 2004, entitled "Managing Workload By Service," by Carol Colrain and Daniel Semler; application Ser. No. 10/934,771, U.S. Published Patent Application 2005-0086263 A1, filed Sep. 3, 2004, entitled "Self-Managing Performance Statistics Repository for Databases," by Gary Ngai, Michael Feng, Alex Tsukerman, Benoit Dageville, Mark Ramacher, Karl Dias, Graham S. Wood, Leng Leng Tan, Richard Sarwal, and Sushil Kumar; application Ser. No. 10/934,344, U.S. Published Patent Application, 2005-0086242 A1, filed Sep. 3, 2004, entitled "Automatic Workload Repository Battery of Performance Statistics," by Gary Ngai, Mark Ramacher, Karl Dias, Graham S. Wood, Connie Green, Venkateshwaran Venkatatamani, Benoit Dageville, and Michael Feng (referred to herein as the Automatic Workload Repository Application); and application Ser. No. 10/917,661, U.S. Published Patent Application 2005-0038800 A1, filed Aug. 12, 2004, now U.S. Pat. No. 7,437,459 entitled "Calculation Of Service Performance Grades In A Multi-Node Environment That Hosts The Services," by Lakshminarayanan Chidambaran, Christopher A. Kantarjiev, James W. Stamos And Peter Povinec.

FIELD OF THE INVENTION

The present invention relates to database statistics, and more specifically, generating a report automatically detailing statistical differences between two periods of time of database performance.

BACKGROUND

Modern database systems are very complex, comprised of millions of lines of code and numerous components, each component performing operations in memory. Database systems often are used for performance-sensitive operations. As a result, a database system administrator may desire to use statistics in order to measure performance of the database system, or to isolate problems.

To effectively diagnose a performance problem, it is vital to have an established performance baseline for later comparison when the system is running poorly. Without a baseline data point, it can be very difficult to identify new problems. For example, perhaps the volume of transactions on the system has increased, or the transaction profile or application has changed, or the number of users has increased.

A common approach to using statistics to diagnose problems or optimize performance is to gather statistics that cover the time when the instance had the performance problem. If you previously captured baseline data for comparison, then you can compare the current data to the data from the baseline that most represents the problem workload.

An example of a statistic a database system administrator may inquire about is session logical reads. A session logical read results when a user goes to read a buffer from the buffer cache, for example, to read one buffer holding data from the "Employee" table. A database system administrator may desire to see all session logical reads for a particular user session, or over a period of time. Time may be measured in terms of clock time or CPU time. CPU time is often computed by reading the CPU time when an operation begins, and reading it again upon completion of the operation. The difference between the two is the CPU time taken by the operation.

Another approach to using statistics for diagnostic or tuning purposes is to take a snapshot of values. A snapshot can be a collection of performance statistics that are captured at a specific point in time. The snapshots are used to compute the delta in the statistic value, the rate of change for the statistic, or if appropriate, the value which was current at the time the snapshot was taken. These snapshots may be gathered at specific intervals; for example, every 30 seconds or every five minutes. Storing the snapshots allows a user to evaluate statistics from past points in time. For example, a snapshot of a database system at one point in time may indicate 50 session logical reads have occurred, while a snapshot at a later time may indicate 150 session logical reads have occurred. From these snapshots, the user can determine that the number of session logical reads that have occurred between the time of the two snapshots is 100.

The snapshot data points may be used to compute the rate of change for the statistic being measured. Storing statistics generated by the database system allows administrators to analyze problems that occurred in the past. The stored statistics also allow the database system's current performance to be compared to a stored baseline.

A current approach to evaluating this type of statistical data is to manually compare reports generated for the two periods. This approach has several drawbacks. One, given the large number of performance statistics potentially tracked by the system, it is difficult to accurately isolate key statistical differences. Two, the periods may not have the same length, such as comparing one hour to two hours, or may not have the same density, such as comparing a period where 100 user requests took place versus a period where 200 user requests took place.

Therefore, to evaluate whether an upgrade affected performance, a current approach is to take a set of snapshots of statistics at a point prior to the upgrade and a set of snapshots after the upgrade. A report is generated detailing the differences, which could be dozens of pages long depending on the number of statistics gathered. The user must manually read the report and try and figure out what is different and quantify it.

Consequently, there is a need for an improved technique that does not suffer from the shortcomings previously described.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates a sample of the generated report according to one embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In one embodiment of the invention, a method is provided for automatically generating a report comprising normalized differences in performance statistics between two separate periods. In one embodiment of the invention, database performance statistics are collected on a periodic basis over various time periods. In order to accurately compare database system performance between two discrete periods of time, the difference in the performance statistics of each period are normalized prior to comparing the two periods with each other.

By normalizing the statistical differences in each period prior to comparing the differences, periods of different lengths of time as well as different levels of database system load may be compared. In one embodiment, a report is automatically generated which lists the performance statistics being evaluated, the difference in the statistic between each period, the value of each statistical difference as normalized by database time, and the difference between the normalized values.

Performance statistics are recorded as snapshots. A snapshot contains data values as they were at a certain time. A series of snapshots comprise a history of performance statistics that is stored in a workload repository at a certain time in the past. Certain performance statistics are tracked using cumulative totals. For example, the total number of session logical reads since the start of the instance is tracked. A snapshot taken at a particular point of time captures the cumulative session logical reads at that point of time. The workload repository may be queried using views.

A use of snapshots is computing rate of change of a statistic used for performance analysis. In such cases, the changes in values between two snapshots are computed using the cumulative values in each of the snapshots.

Snapshots are described in more detail in the Capturing Session Activity Application and the Automatic Workload Repository Application.

Examples of performance statistics for which this invention is particularly useful include "buffer busy waits," "log file syncs," and "user commits."

Generating Performance Statistics Comparisons

Figure 1:
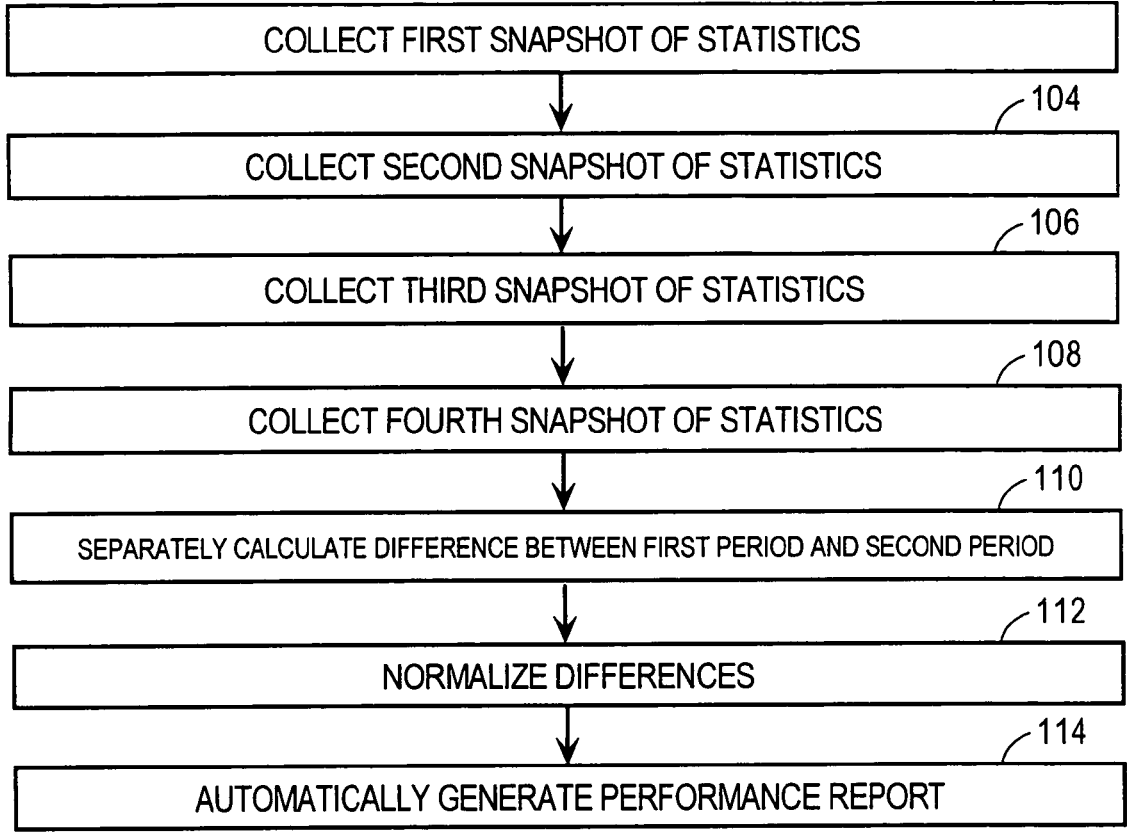
FIG. 1 is a flow diagram that illustrates one embodiment of the invention.

Referring to FIG. 1, a flow diagram 100 that illustrates one embodiment of the invention for normalizing and comparing performance statistics. A snapshot of database performance statistics is collected at a first point in time 102 and a second point in time 104. This second point in time may be hours, days or months from the first point in time. In one embodiment, this calculation is not performed until the user generates a database performance report.

Database performance statistics are then collected at a third point in time 106 and a fourth point in time 108. There are thus two periods of time, one being the period between the first 102 and second 104 point in time, and the other being the third 106 and fourth 108 points in time. In step 110, during each period, a difference in the value of the performance statistic is determined. In step 112, the difference for each period is normalized and compared to each other in order to judge the relative performance difference and diagnose a potential problem or tune the database system.

Specifically, the differences are normalized by database time. Database time is the amount of time the database system is actually working on a database calls by client users. The higher the load on the database system, the higher the amount of database time. A call is a request from a client to perform a task, such as executing a database statement. A call can be commenced by invoking, for example, a function of a client-side interface, such as the Oracle Call Interface. A single user using one clock hour of database time equals one hour of database time. Three users simultaneously using one clock hour of database time equals three hours of database time, even though only one clock hour elapsed. Database time is cumulative performance statistic that is captured by snapshots.

In one embodiment, database time is different from response time. The response time is the time a user waits for a request to return from a database system. Database time is the time spent in the database server servicing the request. In one embodiment, database time does not include the network portion of the user's response time. The network portion may include the time spent sending the request to a database system and the time spent to send the result to users. Also, parts of a request may be executed in parallel by different executing threads of the database system. The threads are processes that operate to perform a task. If parts of the request are executed in parallel within the database system, the database time is the sum of all the time spent in the parallel executing threads of execution. This means that the database time for a request executed in parallel may be much greater than the response time for the same request.

According to one embodiment of the invention, normalization allows statistics collected for periods of disparate elapsed times to be compared, as well as performance statistics collected during periods of varying database system use. For example, the difference in session logical reads is calculated in the following manner according to one embodiment of the invention.

A first snapshot 102 is taken at 10 A.M. and indicates 50 session logical reads have taken place in ten elapsed hours of database time. A second snapshot 104 is taken at 11 A.M. and indicates 150 session logical reads have taken place in twelve elapsed hours of database time. A change to the database system is then made. A third snapshot 106 is taken at 2 P.M. and indicates 1000 session logical reads have taken place in 15 elapsed hours of database time. A fourth snapshot 108 is taken at 3 P.M. and indicates 2000 session logical reads have taken place in 20 elapsed hours of database time.

Thus, there exists a first period from 10 A.M. to 11 A.M. that occurred before the change to the database system, and a second period from 2 P.M. to 3 P.M. that occurred after the change to the database system. According to one embodiment of the invention, if an administrator desires to compare the two periods, the difference between the two data points in each periods is calculated, normalized by database time, and then the difference between the two normalized statistics may be compared.

In the example, in the first period, 100 session logical reads (150-50) occurred in 2 elapsed hours of database time (12-10). The 100 session logical reads divided by the 2 hours of database time results in a rate of 50 session logical reads per hour of database time. In the second period, 1000 session logical reads (2000-1000) occurred in 5 elapsed hours of database time (20-15). The 1000 session logical reads divided by the 5 hours of database time results in a rate of 200 session logical reads per hour of database time. As the table shows below, while the actual number of session logical reads increased 1000% between the two periods, the actual increase when normalized by database time equals 400%. By normalizing the data, the statistics are comparable despite the difference in work density. In one embodiment of the invention, a report is generated 114 detailing the key statistical differences between the two periods of time of database system performance in order of normalized difference.

|  | Time between Snapshot 1 and 2 | Time between Snapshot 3 and 4 | Difference in % |
|---|---|---|---|
| Session logical reads | 100 | 1000 | 1000% |
| Database Time Difference | 2 hours | 5 hours | — |
| Normalized Difference | 50 | 200 | 400% |

Generating Automatic Report

Figure 2:
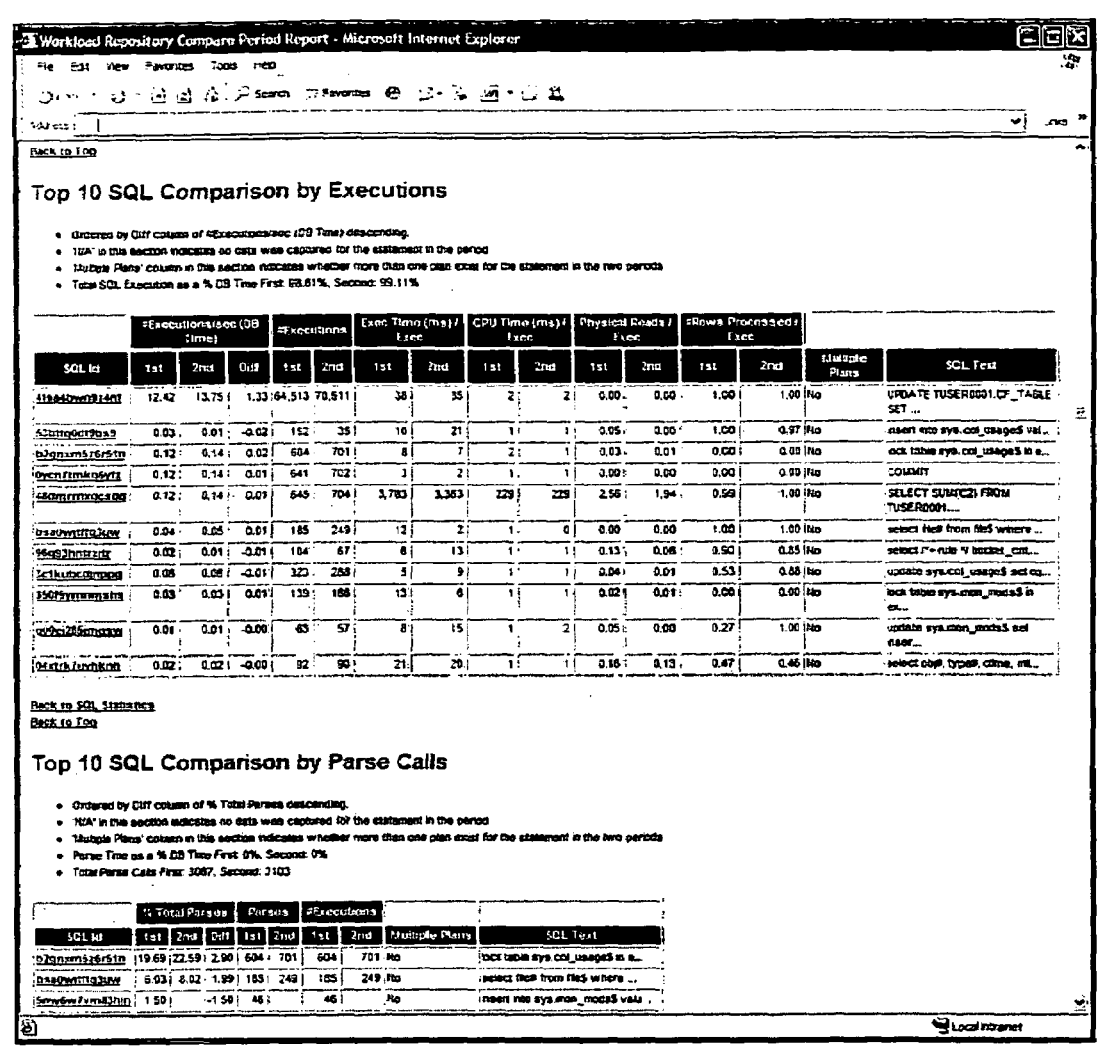

FIG. 2 illustrates a sample of the generated report according to one embodiment of the invention. The report may contain any number of user-selected statistics. In one embodiment of the invention, there exists a default listing of reported statistics. After collecting, normalizing and calculating the differences between the statistic periods, a report is automatically generated that is ordered by statistical category and within that category by the amount of change between normalized statistic values of disparate periods. Other embodiments are envisioned wherein the ordering of the report is customizable, as well as which statistics are included in the report.

By so ordering the report, an administrator is able to quickly identify areas of significant change between periods. According to one embodiment of the invention, the report is generated in plain text. Other embodiments envision the creation of the report in HTML. By so doing, the report may be viewed remotely via a standard web browser.

In one embodiment of the invention, the report is generated as the result of SQL queries.

Hardware Overview

Figure 3:
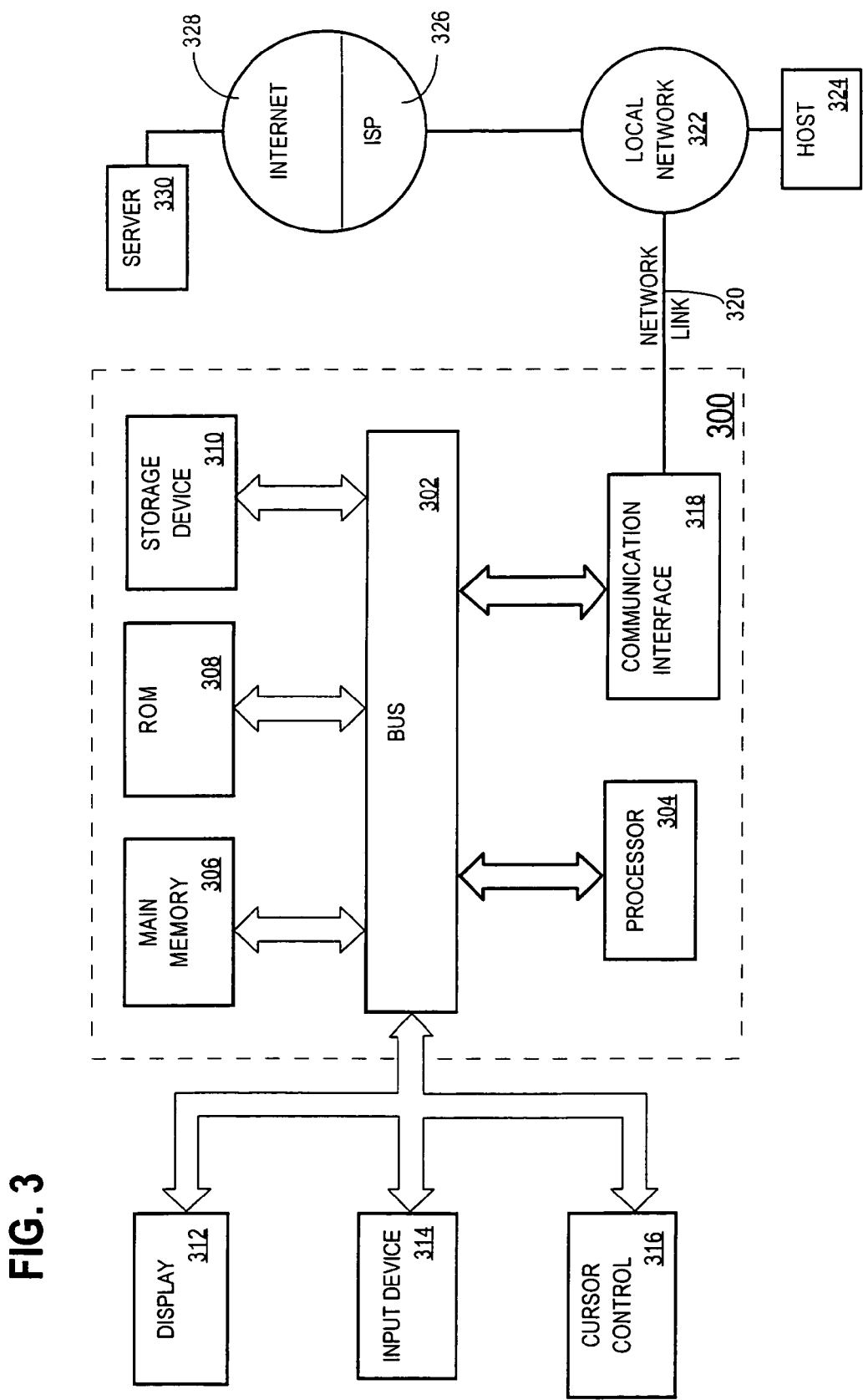
FIG. 3 is a block diagram that illustrates a computer system upon which an embodiment of the invention may be implemented.

FIG. 3 is a block diagram that illustrates a computer system 300 upon which an embodiment of the invention may be implemented. A computer system as illustrated in FIG. 3 is but one possible system on which embodiments of the invention may be implemented and practiced. For example, embodiments of the invention may be implemented on any suitably configured device, such as a handheld or otherwise portable device, a desktop device, a set-top device, a networked device, and the like, configured for containing and/or playing digital video. Hence, all of the components that are illustrated and described in reference to FIG. 3 are not necessary for implementing embodiments of the invention.

Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 304 for execution. Such a medium may take many forms, including but not limited to, non-volatile media, and volatile media. Non-volatile media includes, for example, optical, magnetic, or magneto-optical disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of representing database performance characteristics, the method comprising:
    collecting at least two data values representing measurements of database performance of a database system, wherein the at least two data values correspond to two different periods of time;
    for each of the two periods, determining a database time that represents an amount of time the database system works on calls by users to the database system;
    generating normalized values by normalizing the at least two data values based on the respective database time for the respective periods of time; and
    storing the normalized data values into a persistent or non-persistent memory.

2. A computer-readable volatile or non-volatile medium carrying one or more sequences of instructions which, when executed by one or more processors, causes the one or more processors to perform the method recited in claim 1.

3. The method of claim 1, wherein the at least two data values include cumulative values.

4. A computer-readable volatile or non-volatile medium carrying one or more sequences of instructions which, when executed by one or more processors, causes the one or more processors to perform the method recited in claim 3.

5. The method of claim 1, wherein the first of the at least two data values comprises:
    the difference between statistical values captured by a snapshot at the beginning of a first period and statistical values captured by a snapshot at the end of the first period, and
    the second of the at least two data values comprises:
    the difference between statistical values captured by a snapshot at the beginning of a second period and statistical values captured by a snapshot at the end of the second period.

6. A computer-readable volatile or non-volatile medium carrying one or more sequences of instructions which, when executed by one or more processors, causes the one or more processors to perform the method recited in claim 5.

7. The method of claim 1, wherein the measurements of database performance comprise buffer busy waits.

8. A computer-readable volatile or non-volatile medium carrying one or more sequences of instructions which, when executed by one or more processors, causes the one or more processors to perform the method recited in claim 7.

9. The method of claim 1, wherein the measurements of database performance comprise log file syncs.

10. A computer-readable volatile or non-volatile medium carrying one or more sequences of instructions which, when executed by one or more processors, causes the one or more processors to perform the method recited in claim 9.

11. The method of claim 1, wherein the measurements of database performance comprise user commits.

12. A computer-readable volatile or non-volatile medium carrying one or more sequences of instructions which, when executed by one or more processors, causes the one or more processors to perform the method recited in claim 11.

13. The method of claim 1, wherein the measurements of database performance comprise session logical reads.

14. A computer-readable volatile or non-volatile medium carrying one or more sequences of instructions which, when executed by one or more processors, causes the one or more processors to perform the method recited in claim 13.

15. The method of claim 1, further comprising automatically generating a report based on the normalized values.

16. A computer-readable volatile or non-volatile medium carrying one or more sequences of instructions which, when executed by one or more processors, causes the one or more processors to perform the method recited in claim 15.

17. The method of claim 15, wherein the report is ordered by amount of difference between the normalized data values.

18. A computer-readable volatile or non-volatile medium carrying one or more sequences of instructions which, when executed by one or more processors, causes the one or more processors to perform the method recited in claim 17.

19. The method of claim 15, wherein the report values are generated as the result of a SQL query.

20. A computer-readable volatile or non-volatile medium carrying one or more sequences of instructions which, when executed by one or more processors, causes the one or more processors to perform the method recited in claim 19.

* * * * *